United States Patent [19]

Scarinci

[11] Patent Number: 4,530,239

[45] Date of Patent: Jul. 23, 1985

[54] UNIVERSAL BALANCE PLATE

[76] Inventor: Joseph V. Scarinci, 131 Shore Ct., Apt. 1, North Palm Beach, Fla. 33408

[21] Appl. No.: 599,235

[22] Filed: Apr. 11, 1984

Related U.S. Application Data

[63] Continuation of Ser. No. 267,872, May 28, 1981, abandoned.

[51] Int. Cl.³ .............................................. G01M 1/02
[52] U.S. Cl. ........................................ 73/455; 73/485; 73/487
[58] Field of Search .................. 73/485, 487, 455, 460

[56] References Cited

U.S. PATENT DOCUMENTS

| | | | |
|---|---|---|---|
| 2,110,343 | 3/1938 | Taylor | 73/483 |
| 2,493,872 | 1/1950 | Henry | 73/485 |
| 3,143,327 | 8/1964 | Watt | 73/485 |
| 3,203,255 | 8/1965 | Rexroat | 73/485 |
| 4,070,915 | 1/1978 | Caroff | 73/487 |

Primary Examiner—Stewart J. Levy
Assistant Examiner—John E. Chapman, Jr.
Attorney, Agent, or Firm—Fishman & Dionne

[57] ABSTRACT

A universal balancing plate is presented for balance of rotational parts. The plate is an aluminum plate which is webbed for strength and hard coated for wear. There are five slots in radial locations in which five steel details slide on rotary screws. Three slots carry tool locators to pilot the part to be balanced, and two slots carry hold down bolts to secure the part to the plate. Each movable detail has a vernier scale attached for quick radial adjustment via a crank at the outside diameter of the aluminum plate.

22 Claims, 5 Drawing Figures

UNIVERSAL BALANCE PLATE

This application is a continuation of application Ser. No. 267,872, filed May 28, 1981, now abandoned.

BACKGROUND OF THE INVENTION

This invention relates to the field of balancing plates. More particularly, this invention relates to a universal balance plate which is particularly suitable for accommodating a large variety of parts such as disc and blade assemblies for turbine engines, or other large rotating machinery, with a minimum number of tools and balancing machine set-up time.

Various types of machines or equipment for balancing turbine blade and disc assemblies have been known in the art. These include flat plates with full pilot diameter, pegged plates, which are flat plates drilled to accept plugs of various diameters for specific parts; Woodworth chucks which involve expanding fingers to accept a single part; and hydraulic chucks, which involve a steel ring expanded with hydraulic pressure to accept a single part. With the flat plate equipment, it is difficult to rotate the part to be balanced to reindex 180° to eliminate tooling eccentricity due to tight snap diameter. Flat plates also involve costly set-up time when changing fixtures and are characterized by high wear on locating diameters due to tight fits. The pegged plate element has the disadvantage that the plate is limited to the number of drilled positions to accept a few parts of a given type. It is also difficult to correctly identify the holes in the plate to accept the necessary pegs. The Woodworth chuck device is characterized by excessive wear on expanding fingers. Also, it is difficult to balance out tool eccentricity, and the tool must be tailored for a single job. Also with the Woodworth chuck extensive time is required to change expanding jaws for different parts, and very high initial tool cost is involved. The hydraulic chuck device has the disadvantage that it is a single purpose tool. With the hydraulic chuck device it is very time consuming to change, store and maintain chucks when a small quantity of parts are being balanced, and the hydraulic chuck device involves high initial tooling costs per part.

SUMMARY OF THE INVENTION

The universal balance plate of the present invention overcomes or alleviates many of the disadvantages or shortcomings of the prior art device. The universal balance plate of the present invention is an aluminum plate which is machined on one side to have five webs which extend radially from a central hub. The webs serve as stiffening elements as well as housing slides for locating and hold-down details. Each web has a radial slot in which a detail is slidably mounted on a rotating screw. Three of the details, located 120° apart, carry tool locators to pilot the part to be balanced. Two of the slots, located 180° apart, carry hold-down bolts to lock the part to be balanced to the plate. The three tool locators and the hold-down elements are all adjustable in their radial positions, and they serve to position the part in a desired horizontal plane. Each of these elements has a vernier scale attached for quick radial adjustment via an adjusting crank which operates the screws.

The universal balance plate of the present invention is used in conjunction with a standard vertical balancing machine, such as a Gishold UV-1 or equivalent. The universal balance plate of the present invention is mated and secured to the balancing machine spindle with bolts or other fastening devices in a normal manner. The three tool locators are adjusted on the vernier scales to be positioned at the diameter of the part to be balanced. The two adjustable hold-downs are then positioned to line up with holes in the bolt circle of the part to be balanced. The plate itself is then balanced by adjustment of weights in a balancing circle at the outer periphery of the balance plate. The part to be balanced is then mounted on the balance plate at the three locators and attached to the balance plate by the two hold-downs. The balancing machine is then operated, and the part is balanced in accordance with standard balancing practices and techniques.

It is to be noted that with the tool of the present invention the locating and hold-down details are each locked by a jam nut and they are automatically retained in place by their interface or interaction with the part being balanced. Also, once the plate is balanced on initial use, it does not require rebalancing, because all major imbalance is removed from the plate.

BRIEF DESCRIPTION OF THE DRAWING

Referring now to the drawings, wherein like elements are numbered alike in the several FIGURES.

DESCRIPTION OF THE PREFERRED EMBODIMENT

Figure 1:
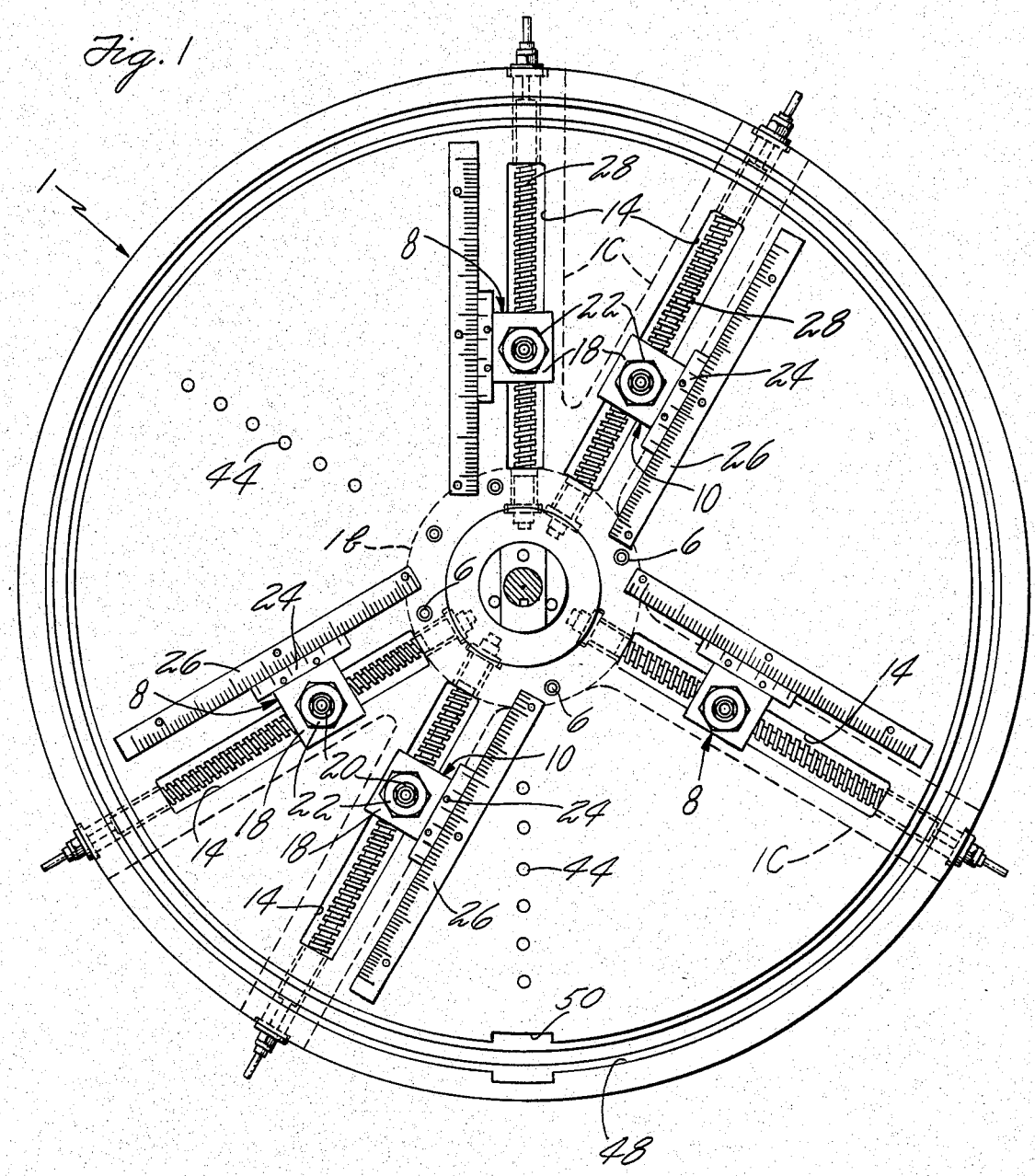
FIGS. 1 is a front view of a balancing plate in accordance with one embodiment of the present invention.
Figure 2:
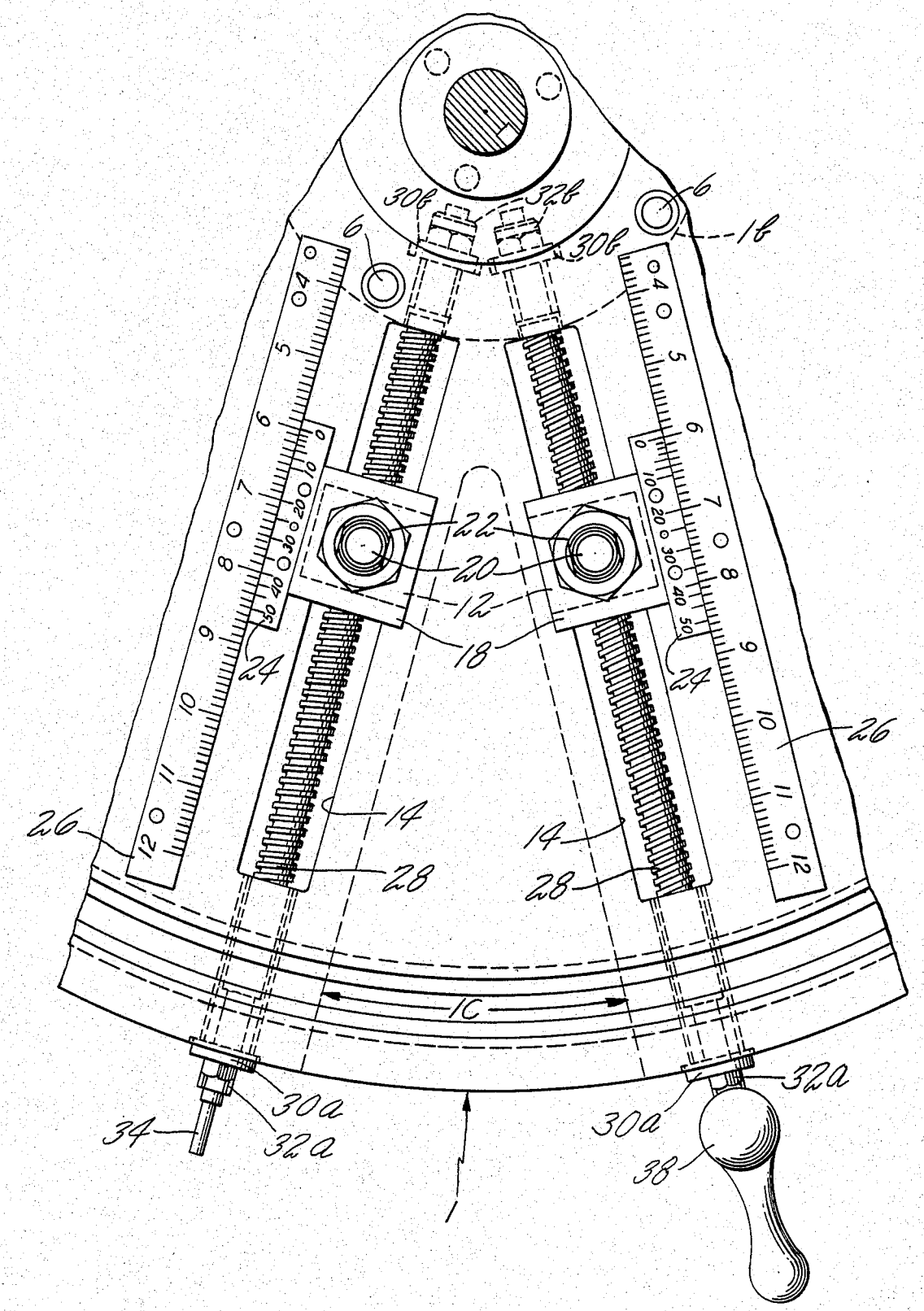
FIG. 2 is an enlarged view of a portion of FIG. 1.
Figure 3:
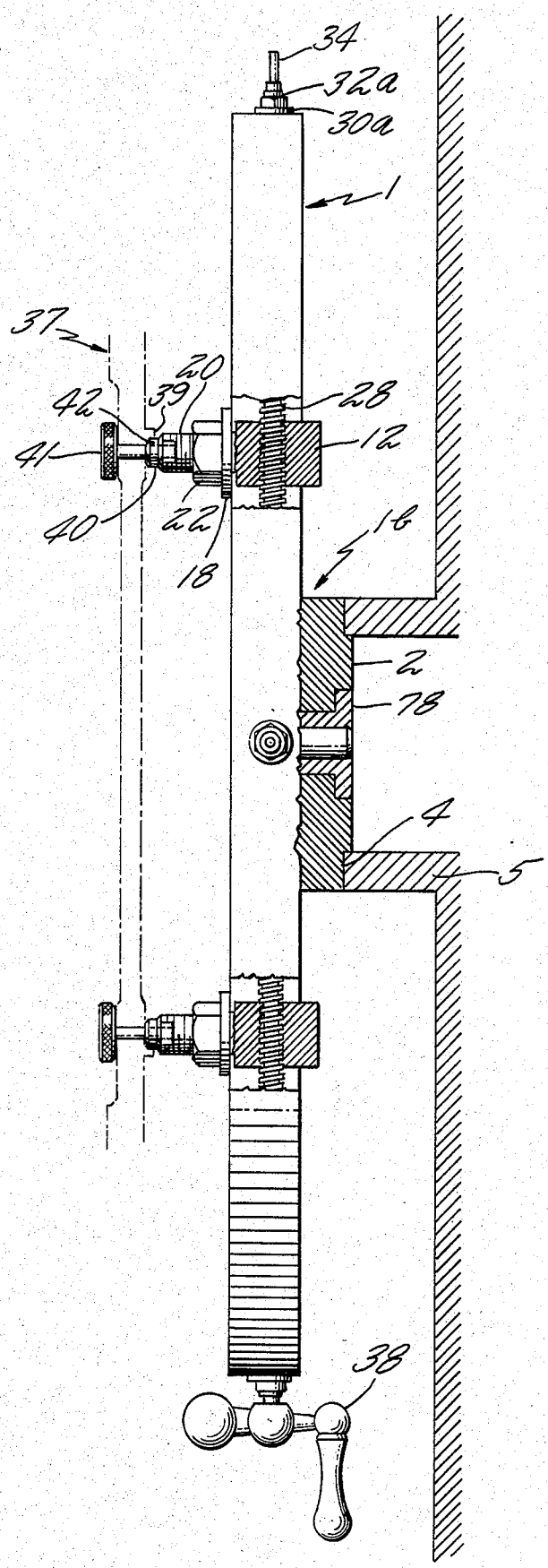
FIG. 3 is a side view of a balancing plate in partial cross-section showing the attachment of an object to be balanced according to one embodiment of the present invention.

Referring jointly to FIGS. 1-3, the universal balance plate 1 of the present invention is shown as a monolithic circular aluminum plate or disc 1. Plate 1 has a flat surface on one side, and the other side is machined to have a central circular hub 1(b) and 5 radiating webs 1(c). Three of the radiating webs are spaced 120° apart, and two of the radiating webs are located 180° removed from each other. The radiating webs serve both to stiffen the balance plate and to house locating and hold-down details. Balance plate hub 1(b) is contoured at 2 and has a shoulder at 4 to receive and mate with a spindle 5 from a standard balancing machine. The balance plate is bolted to the spindle of the balancing machine through bolt holes 6 in hub 1(b).

Projecting from the flat side of plate 1 are three radially movable locators 8 for properly positioning any rotating part to be balanced, such as a turbine disc, and two radially movable hold-downs 10 for fixing the part to be balanced to the balance plate. Each locator 8 and each hold-down 10 includes a block 12 positioned in a radial slot 14 to guide the movement of the locators 8 and hold-downs 10. The slots 14 are formed in plate 1 at the location of each of the webs 1(c) with the locators 8 being in the three slots spaced 120° apart and the hold-downs 10 being in the slots 180° apart. Blocks 12 have flanges on the bottom thereof for engaging the bottom of each web in plate 1. On the top or flat side of plate 1 a square washer 18 fits over a projecting bolt portion 20 of each block 12, and a nut 22 is threaded on bolt 20 to secure block 12 to plate 1 so that the blocks can slide along the radial slots 14. Each square washer 18 has a vernier scale 24 thereon which registers with a large fixed scale 26 adjacent each slot 14 on the flat surface of balance plate 1. An adjusting screw 28 is mounted for rotation on each end of each slot 14 by well known means, such as sleeve bearings 30A and 30B with bolts 32A and 32B being threadably mounted to the adjusting screws 28 for maintaining them axially in place. The outer end 34 of each adjusting screw 28 is in the form of a square shank to receive a removable crank 38 for adjusting each of the locators 8 or hold-downs 10 which are movable and adjustable by the engagement between the threads on adjusting screws 28 and mounting blocks 12. The crank 38 is removable or detachable from each of the end shanks 34 during balancing operation of the device. The same locators and hold-downs may be used for many different parts, thus making it unnecessary to change the locators and hold-downs each time a new part is to be balanced.

A disc or part to be balanced (indicated in phantom at 37 in FIG. 3) will have a locating ring (also indicated at 39 in phantom in FIG. 3). The three locators 8 are positioned so that the machined locator end parts 40 engage the inner diameter of the ring 39. Bolts 41 are then positioned down through holes in the disc or part to be balanced and are screwed into bolt holes 42 in each of the hold-downs 10 to fix and secure the disc in place. The balancing machine is then operated in known fashion to balance the disc or other part mounted on the universal plate.

Before the disc of other part to be balanced is mounted on the universal balance plate, the plate is first rough calibration balanced and fine tuned to balance out the plate itself. The rough balance or calibration is effected by means of calibration holes 44, as seen in FIG. 1, which are located in a long radial line in plate 1 to receive known weight at known radii to calibrate the plate. For fine balance or fine tuning, balance plate 1 also includes balance weights (not shown) positioned in an annular groove located around the outer circumference of the plate. The balance weights are loaded into groove 48 via an opening 50, and the weights are then positioned as required around the outer circumference for balancing. Each weight has a threaded opening at the center thereof in which a small threaded screw is located to lock the weight in position when the proper position for the weight is determined.

Figure 4:
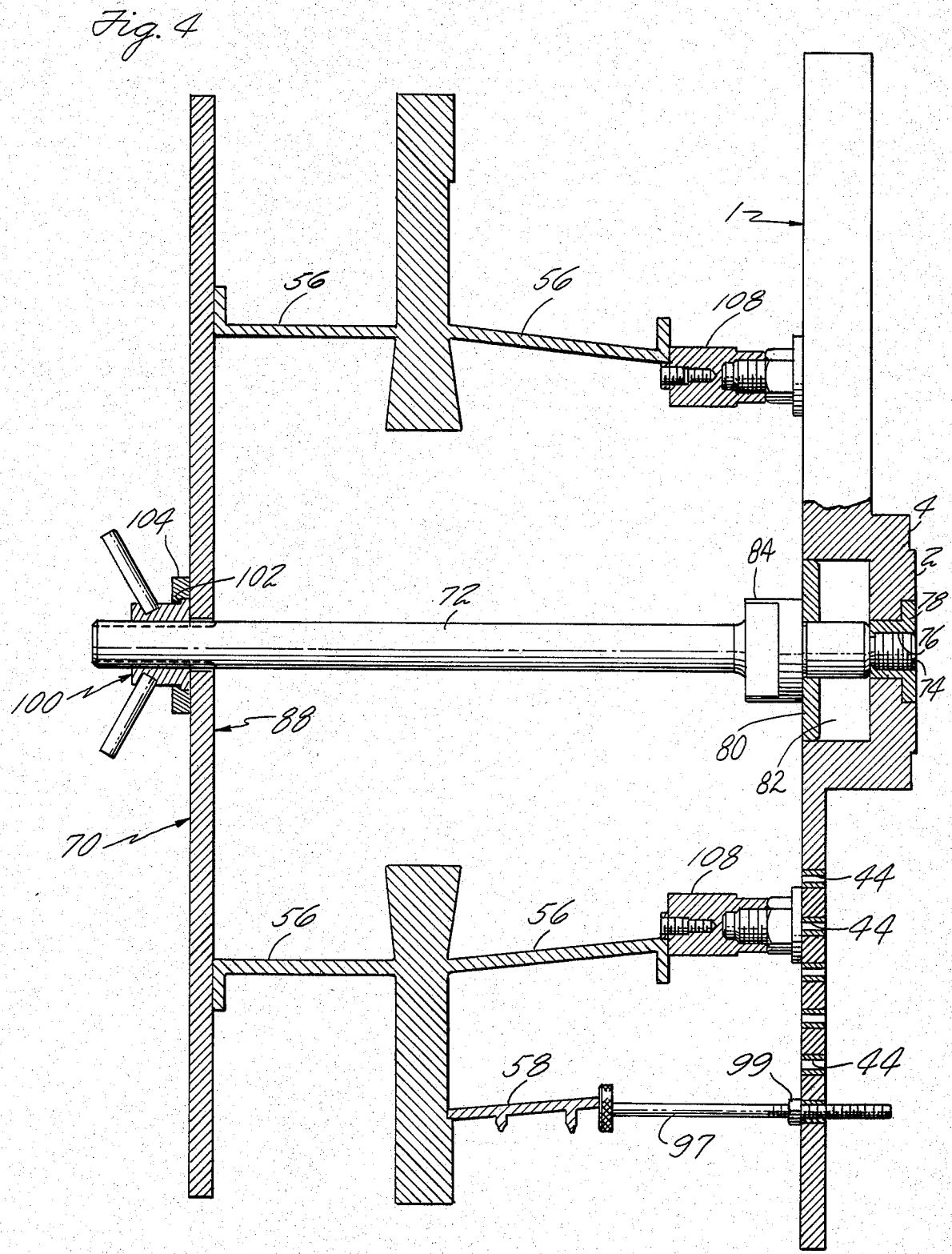
FIGS. 4 and 5 are side views of the balancing plate in partial cross-section, showing the attachment of an object according to another embodiment of the present invention.
Figure 5:
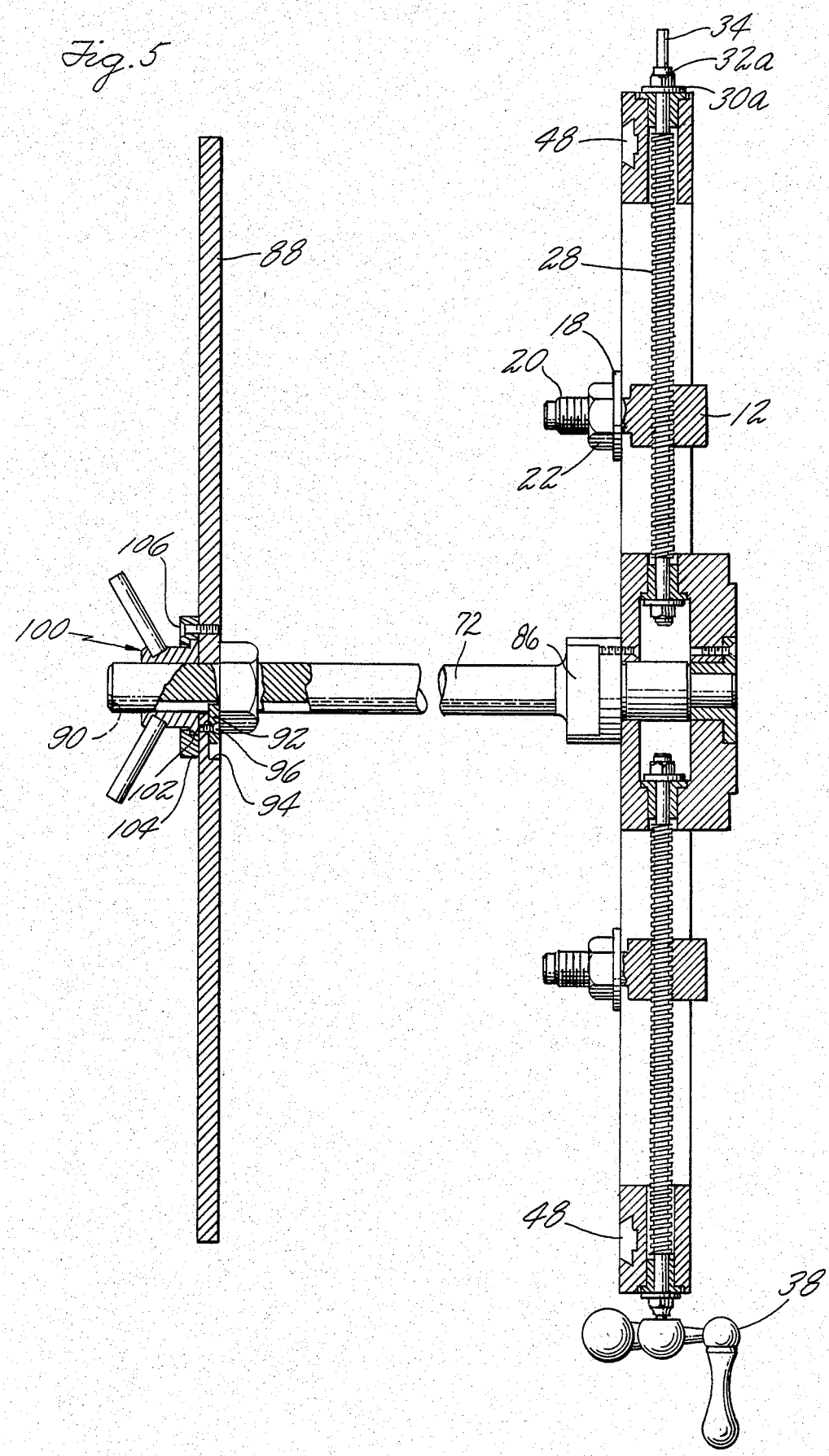

Referring now to FIG. 4, an alternative arrangement is shown for mounting and balancing a part such as a rotor disc which has extensions, such as extensions 56 for seals, such as items 58, to be balanced with the rotor disc. For discs of this type, a modified hold-down element 70 is employed. Hold-down element 70 includes a center post 72 having one end threaded at 74 which is sized to be positioned in threads 76 formed in a steel insert 78 fixed into the center of the contoured surface 2 of balance plate 1. Center post 72 has a circular pilot member 80 which fits into a cylindrical recess 82 for accurately positioning the center post with respect to the balance plate 1. The center post 72 has an enlarged portion 84 adjacent the pilot member 80 having flat sides 86 so that the center post 72 can be turned by a wrench or similar tool for tightening the center post in position or for removing it. With reference to FIG. 5, the hold-down bar 88 is secured to post 72 by a key slot 92 extending down the length of post 72 which receives a key 90 which is fixed to the inner side of the hold-down bar 88 in a groove 94 by a screw 96. Seal supports 97 are threaded into calibration holes 4 and are secured by nuts 99 to support the end of the seal 58. (See FIG. 4)

Referring back to FIG. 5 the outer surface of the center post 72 is threaded. A wing nut 100 which is rotatably mounted to hold-down 88 engages the threaded surface of post 72. The wing nut 100 is mounted by providing an annular flange 102 at its base which is held down by a washer 104 with an undercut groove thereon. The washer 104 is held to the hold-down bar 88 by crews 106.

The alternative structure described above with regard to FIGS. 4 and 5, show one way in which an irregularly shaped disc or other element can be mounted to the universal balance plate for balancing. As will be apparent to those skilled in the art, other modified structures can be employed to mount other irregularly shaped discs or other elements to be balanced on the universal balance plate. Similarly, if necessary, adjustable extensions 108 can be mounted on the locators 8 or hold-downs 10 to locate and hold down other irregularly shaped parts.

As will be understood from the foregoing description, a universal balance plate has been presented which is simplified in both construction and operation. The universal balance plate of the present invention overcomes or alleviates many of the disadvantages and drawbacks of prior art balance plates and achieves a structure which is suitable for quick and reliable mounting and balancing of rotor elements for turbines and compressors and other rotating parts which require balancing.

The universal balance plate of the present invention includes many features and advantages not found in the prior art. For example, the present invention is comprised of a light weight aluminum rib construction. This is in distinct contrast to the heavier solid steel plate construction of the prior art. Besides a lowering of material costs and improving the ease of handling, the novel aluminum construction provides additional unexpected improvements in terms of decreasing the unnecessary or parasitic mass of the tools. Thus, the aluminum plate construction provides improved useful load carrying limits for the balancing plate of the present invention.

As discussed, the present invention is well suited for mounting and precision balancing of rotor elements for turbine parts, particularly, jet engine high speed rotating parts. It is well known that such parts require an accuracy in balancing up to about 0.10 ounce inches. The universal balance plate of the present invention achieves this critical accuracy by providing precision balancing of high speed jet engine rotating parts to about 0.10 ounce inches.

Yet another important feature is that the universal balance plate of the present invention attaches to any jet engine or similar rotating part regardless of engine manufacture or model. The instant invention will also accept multiple parts at the same with or without special attachments. This is in distinct contrast to "single purpose" prior art balance tools which typically fit only one or several parts. Thus, fewer tools must be purchased and so the present invention reduces costs for purchasing of tools as well as costs occurring during manufacturing and repair of jet engine rotating parts and the like.

While a preferred embodiment has been shown and described, various modifications and substitutions may be made thereto without departing from the spirit and scope of the invention. Accordingly, it must be understood that the present invention has been described by way of illustration and not limitation.

What is claimed is:

1. A plate for use with a machine for precision balancing of a jet engine rotary machinery piece said plate comprising:

aluminum disc means, said disc means having an axial hub, said disc means being rotatably secureable to a spindle of a balancing machine, said disc means having first and second surfaces;

three locating means, said locating means being radially mounted upon said disc means second surface about said hub, said locating means being spatially separated equally from one another, said locating means being radially movable with respect to said disc means hub and extending above said disc means first surface, said locating means being retainable in a desired position, said locating means engaging and centering a rotary machinery piece on said disc means; and two hold down means, said hold down means being radially mounted upon said disc means second surface about said hub, said hold down means being spatially separated 180° part from one another and being angularly spaced relative to said locating means, said hold down means being radially movable with respect to said disc means hub and extending above said disc means first surface, said hold down means being retainable in a desired position, said hold down means engaging and securing a centered rotary machinery piece to said disc means.

2. The apparatus of claim 1 further comprising:
   a locating ring on said disc for accurately centering said disc means upon a balancing machine.

3. The apparatus of claim 1 wherein said locating means comprises:

elongated locating web means, said locating web means being radially mounted upon said disc means second surface about said hub, said locating web means being spatially separated equally from one another, said locating web means having first and second ends with said first end nearest said hub, said locating web means being provided with an elongated radial slot;

locating block means, said block means being slidably mounted within said radial slot, said locating block means being radially moveable towards and away from said disc means hub, said locating block means extending above said disc means first surface, said locating block means engaging and centering a rotary machinery piece on said disc means; and means for retaining said locking block means within said locating radial slot in a desired radial position.

4. The apparatus of claim 2 wherein said locating means comprises:

elongated locating web means, said locating web means being radially mounted upon said disc means second surface about said hub, said locating web means being spatially separated equally from one another, said locating web means having first and second ends with said first end nearest said hub, said locating web means being provided with an elongated radial slot;

locating block means, said block means being slidably mounted within said radial slot, said locating block means being radially moveable towards and away from said disc means hub, said locating block means extending above said disc means first surface, said locating block means engaging and centering a rotary machinery piece on said disc means; and means for retaining said locating block means within said locating radial slot in a desired radial position.

5. The apparatus of claim 1 wherein said hold down means comprises:

elongated hold down web means, said hold down web means being radially mounted upon said disc means second surface about said hub, said hold down web means being spatially separated equally from one another, said hold down web means having first and second ends with said first end nearest said hub, said hold down web means being provided with an elongated radial slot;

hold down block means, said block means being slidably mounted within said radial slot, said hold down block means being radially moveable towards and away from said disc means hub, said hold down block means extending above said disc means first surface, said hold down block means engaging and securing a centered rotary machinery piece on said disc means; and means for retaining said hold down block means within said hold down radial slot in a desired radial position.

6. The apparatus of claim 2 wherein said hold down means comprises:

elongated hold down web means, said hold down web means being radially mounted upon said disc means second surface about said hub, said hold down web means being spatially separated equally from one another, said hold down web means having first and second ends with said first end nearest said hub, said hold down web means being provided with an elongated radial slot;

hold down block means, said block means being slidably mounted within said radial slot, said hold down block means being radially moveable towards and away from said disc means hub, said hold down block means extending above said disc means first surface, said hold down block means engaging and securing a centered rotary machinery piece on said disc means; and means for retaining said hold down block means within said hold down radial slot in a desired radial position.

7. The apparatus of claim 4 wherein said hold down means comprises:

elongated hold down web means, said hold down web means being radially mounted upon said disc means second surface about said hub, said hold down web means being spatially separated equally from one another, said hold down web means having first and second ends with said first end nearest said hub, said hold down web means being provided with an elongated radial slot;

hold down block means, said block means being slidably mounted with said radial slot, said hold down block means being radially moveable towards and away from said disc means hub, said hold down block means extending above said disc means first surface, said hold down block means engaging and securing a centered rotary machinery piece on said disc means; and means for retaining said hold down block means within said hold down radial slot in a desired radial position.

8. The apparatus of claim 3 wherein said locating web means are integral with said second surface of said disc means.

9. The apparatus of claim 4 wherein said locating web means are integral with said second surface of said disc means.

10. The apparatus of claim 5 wherein said hold down web means are integral with said second surface of said disc means.

11. The apparatus of claim 6 wherein said hold down web means are integral with said second surface of said disc means.

12. The apparatus of claim 7 wherein said locating web means are integral with said second surface of said disc means.

13. The apparatus of claim 12 wherein said hold down web means are integral with said second surface of said disc means.

14. The apparatus of claim 7 wherein said hold down block means and said locating block means includes:

a projection bolt portion extending through said radial slots of said hold down web means and said locating web means.

15. The apparatus of claim 13 wherein said hold down block means and said locating block means includes:

a projection bolt portion extending through said radial slots of said hold down web means and said locating web means.

16. The apparatus of claim 7 wherein said hold down block means is secured to the centered machinery piece by a bolt.

17. The apparatus of claim 13 wherein said hold down block means is secured to the centered machinery piece by a bolt.

18. The apparatus of claim 7 wherein said hold down block means is secured to the centered machinery piece by a clamp.

19. The apparatus of claim 13 wherein said hold down block means is secured to the centered machinery piece by a clamp.

20. The apparatus of claim 2 wherein said centering means are weights which are removably secured to said disc means.

21. The apparatus of claim 7 wherein said centering means are weights which are removably secured to said disc means.

22. The apparatus of claim 13 wherein said centering means are weights which are removably secured to said disc means.

* * * * *